United States Patent [19]

Zepp et al.

[11] Patent Number: 5,527,115
[45] Date of Patent: Jun. 18, 1996

[54] BEARING MOUNTING ARRANGEMENT

[75] Inventors: Philip H. Zepp; Lawrence R. Mancini, both of North Canton, Ohio

[73] Assignee: The Hoover Company, North Canton, Ohio

[21] Appl. No.: 272,553

[22] Filed: Jul. 11, 1994

[51] Int. Cl.⁶ .................................................. F16C 43/00
[52] U.S. Cl. ........................ 384/537; 384/536; 384/582
[58] Field of Search ............................... 384/537, 539, 384/536, 582, 221

[56] References Cited

U.S. PATENT DOCUMENTS

| | | |
|---|---|---|
| 1,081,930 | 12/1913 | Randall . |
| 1,086,781 | 2/1914 | Miller . |
| 1,107,690 | 8/1914 | Miller . |
| 1,200,245 | 10/1916 | Sevel . |
| 1,386,255 | 8/1921 | Hindle et al. . |
| 1,903,776 | 4/1933 | Clark et al. . |
| 3,063,761 | 11/1962 | Hoddy et al. . |
| 3,107,946 | 10/1963 | Drake ........................................ 384/537 |
| 3,147,050 | 9/1964 | Wulfert et al. . |
| 3,188,153 | 6/1965 | Turk . |
| 3,223,464 | 12/1965 | Hoddy et al. . |
| 3,679,279 | 7/1972 | Van Dorn et al. ...................... 384/537 |
| 4,384,226 | 5/1983 | Sato et al. ............................... 384/537 |

FOREIGN PATENT DOCUMENTS 1028191  5/1966  United Kingdom .

*Primary Examiner*—Lenard A. Footland
*Attorney, Agent, or Firm*—A. Burgess Lowe; Richardson B. Farley

[57] ABSTRACT

A bearing mounting arrangement is provided in which a dimension stabilizing ring is molded into a motor housing bearing cap to limit critical bearing mounting variations in the, as molded, plastic bearing cap. The dimension stabilizing ring has an inner castellated cylindrical surface forming axially parallel grooves. These grooves are filled with plastic during molding which include portions that intrude into the bearing mounting bore so that a bearing may be force fit in this bore, deforming these plastic portions. This fixes the outer race of the bearing and prevents rotation of it relative to the bearing cap of the motor housing.

11 Claims, 3 Drawing Sheets

BEARING MOUNTING ARRANGEMENT

BACKGROUND OF THE INVENTION

1. Field of the Invention

This invention relates to bearing mounting arrangements and, more particularly, to a plastic bearing mounting arrangement.

2. Summary of the Prior Art

The shaft mounting of a bearing member having inner and outer races to fix the outer race relative to its housing has been a problem existent in the bearing art for a very long time. One arrangement for preventing rotation of the outer race of the bearing, for example, and the one presently utilized by the assignee of this invention, utilizes a corrugated split substantially cylindrical flexible piece which is inserted in the bearing housing bore. The bearing is then inserted inside this piece and the flexible corrugations maintain the outer race of the bearing fixed to its housing.

However, proper alignment of the bearing, corrugated flexible piece and bearing bore are somewhat difficult and require a tedious manual assembly line operation which is not always successful. All other known bearing mounting arrangements also suffer some basic disadvantages when viewed in the light of an inexpensive as is molded product in which its housing must accurately provide for a bearing mounting structure.

Accordingly, it is an advantage of the invention to provide an improved bearing mounting arrangement.

It is a further object of the invention to provide an improved bearing arrangement in a molded housing.

It is a still further object of the invention to integrally fix a dimension stabilizing ring in a molded housing so that a bearing may be successfully mounted in this same housing.

It is an even further object of the invention to provide a force fit between a molded housing and its inserted bearing to fix the bearing accurately within the bearing.

SUMMARY OF THE INVENTION

An electric motor molded end cap is provided with a bearing mounting arrangement which fixes the outer race of the bearing fast with the housing so it does not rotate relative to it. The motor end cap is molded around a dimension fixing ring that provides a portion of the formed bore that receives the bearing. The dimension fixing ring has a castellated inner cylindrical bore surface. When the motor end cap is molded the grooves in the ring formed by the castellations are overfilled with plastic to provide rib like projections that extend inwardly relative to the innermost bore diameter of the fixing ring. These rib like projections then receive the bearing in a force fit relationship partially deforming and, perhaps, partially scarfing, but fixing the outer race of the bearing in a firm, non-rotational relationship with the molded end cap. The castellated ring is held fixed in the end cap by, generally, the surrounding plastic and a series of molded in plastic angulated tabs that engage its innermost face relative to its end cap mounting.

BRIEF DESCRIPTION OF THE DRAWING

Reference may now be had to the accompanying Drawings for a better understanding of the invention, both as to its organization and function, with the illustration only showing a preferred embodiment, but being only exemplary and in which.

DETAILED DESCRIPTION OF THE INVENTION

Figure 1:
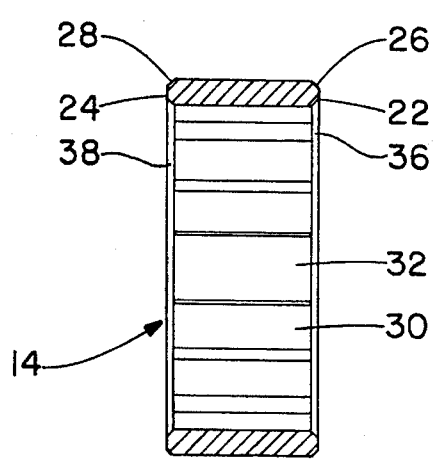
FIG. 1 is a cross sectional elevation view of the castellated ring forming a part of my invention and taken on line 1—1 of FIG. 2.
Figure 2:
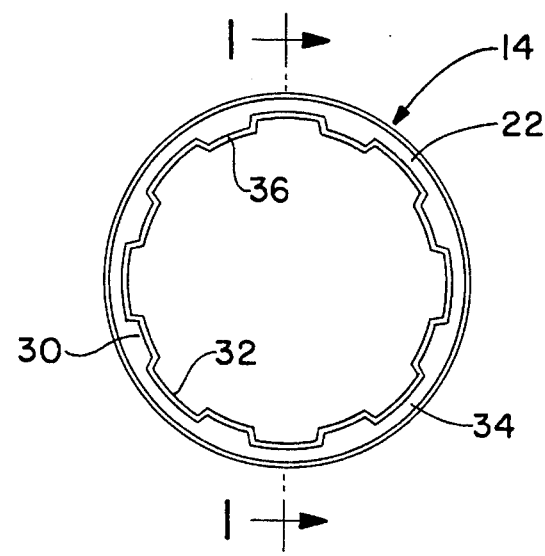
FIG. 2 is an end elevational view of this same ring.

There is shown in FIGS. 1–7, a bearing mounting arrangement 10 including a motor end cap 12 of an electric motor housing 13 (both shown only fragmentarily), a dimension stabilizing ring 14 molded in the end cap 12 when it is formed and a bearing 16 non-rotationally mounted within the end cap 12 and the dimension stabilizing ring 14.

End cap 12 may conveniently form the end of the motor housing 13 in an integral and conventional manner so that an armature shaft (not shown) may also be conventionally bearingly mounted therein. End cap 12 includes an outer terminating wall 18 and a bearing receiving well 20 disposed therein and conventionally opens inwardly relative to remainder of the motor housing 13.

Dimension stabilizing ring 14 is hollow and generally cylindrical in shape and is ideally formed of sintered copper steel per ASTM-B-426, Grade 1 Type IV. It includes front and rear faces 22 and 24, respectively, which are formed beveled on its exterior edges by bevels 26 and 28, respectively, to remove sharp corners from the ring 14. Its interior surface is castellated to form inwardly extending truncated pie segment shaped portions 30 between which are disposed slightly wider grooves 32 that have the outer outline of the outer edge of a pie segment. The portions 30 and grooves 32 are curved on their terminating edges to form interrupted cylindrical surfaces, the purpose of which will later become obvious. A border 34, formed by the outline of truncated pie segment shaped portions 30 and the grooves 32, is also beveled on each face 22 and 24 of the ring 14 by border bevels 36, 38, respectively. These bevels also remove sharp edges from the dimension stabilizing ring 14.

The dimension stabilizing ring 14 is disposed within motor end cap 12 in a molded in state, that is, it is located fixed within the motor end cap 12 of the electric motor housing 13 as it is formed by ejection molding. The dimension stabilizing ring is then disposed in a bore 39 in the motor end cap 12.

The end cap 12 includes a series of angulated axially extending integral tabs 40, 40, 40 that angle axially parallel, inwardly relative to motor housing 13 from dimension stabilizing ring 14. As shown, these tabs are also slightly radiused because of mold tooling by radiused section 53. These tabs are arrayed around the internal circumferential periphery of bore 39 and they have a height close to the thickness of the dimension ring 14 so that extend abuttingly inwardly along the bevel 36 for about ¾ of its length.

These integral tabs hold the dimension stabilizing ring 14 within end cap 12 against a flat circular land 41 in well 20. These tabs along with the overlying flat disk like surface 41 of well 20 tend to fixedly locate the dimension stabilizing ring 14. Below the disk like surface 41, the well 20 includes a flattened hollow cup section 45 which provides, conventionally, clearance for a shaft end (not shown). The tabs 40, 40, 40 are arrayed equally spaced around the periphery of the bevel 36 of the dimension stabilizing ring 14 so that so that a pair of tabs 40, 40 are located at each groove 32 and a single tab 40 is centrally located at each of the inner tabs 30 of dimension stabilizing ring 14.

The motor end cap, as molded, includes molded plastic 43 essentially filling each of the grooves 32 of dimension stabilizing ring 14 to yield a uniform partially cylindrical surface 42 in each groove 32 joining substantially to similar cylindrical surface 44 formed on each of the inner tabs 30 of the dimension stabilizing ring 14 so that a substantially continuous cylindrical surface 46 is formed in the well 20 for the lodgement of the bearing 16. The tabs 40, 40, 40 help maintain this plastic material in position within the grooves 32 of the dimension stabilizing ring 14.

The cylindrical surface 42 in each of the grooves 32 terminates inwardly in a bevel 48 that forms continuity with bevel 38 of each of the grooves 32 of dimension stabilizing ring 14 for a smooth transition and so that the molded plastic of motor end cap 12 and the dimension stabilizing ring 14 intermeld.

Figure 3:
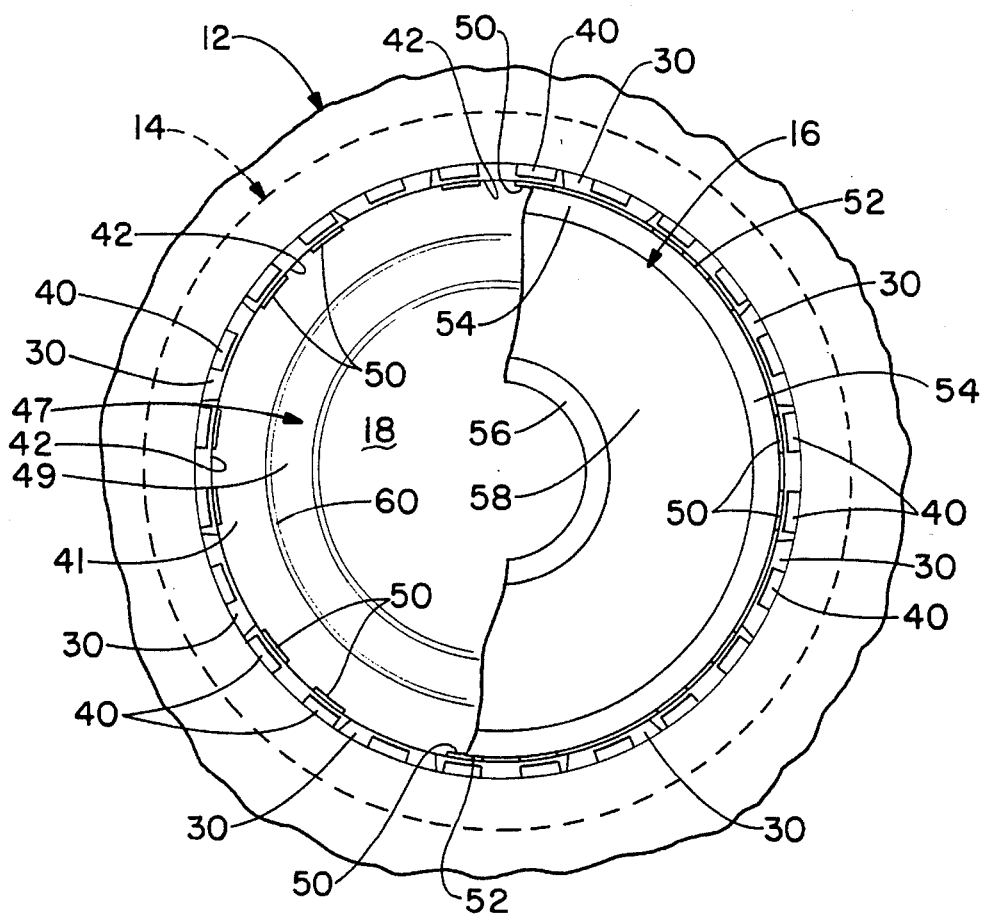
FIG. 3 is an end elevational view of the assembled bearing, ring and end cap looking generally down on the structure of FIG. 4.
Figure 4:
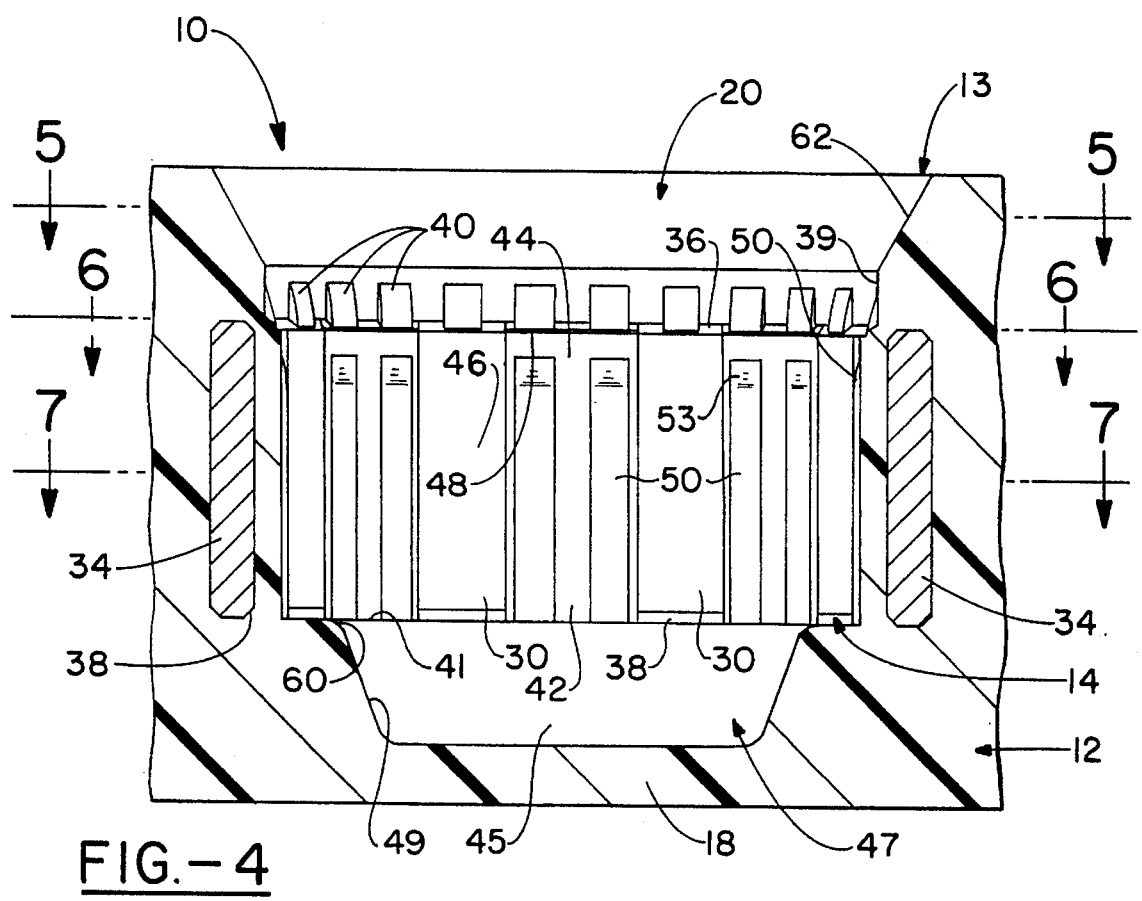
FIG. 4 is an enlarged cross sectional medial planar view of the structure of FIG. 3 with the bearing omitted.
Figure 5:
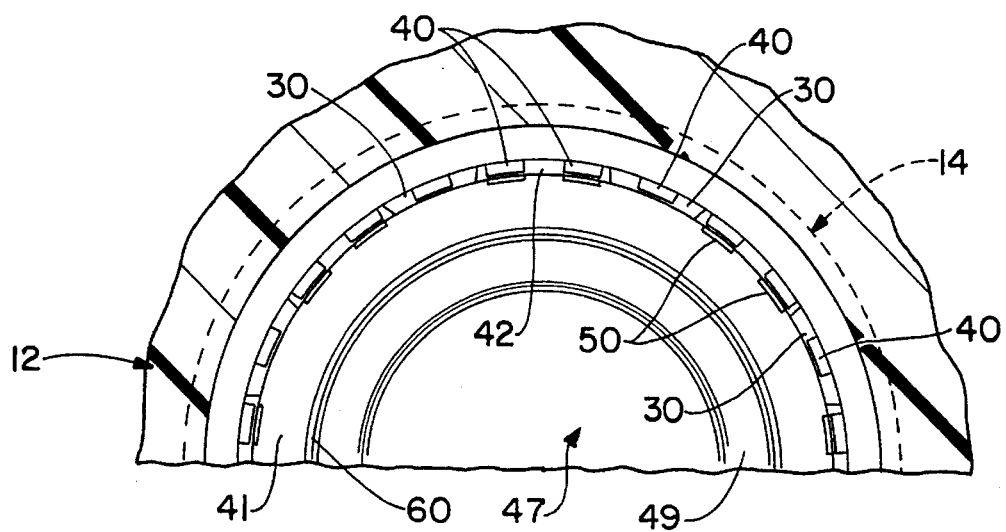
FIG. 5 is a view somewhat like FIG. 3 but shown enlarged and without the mounted bearing and taken on line 5—5 of FIG. 4.
Figure 6:
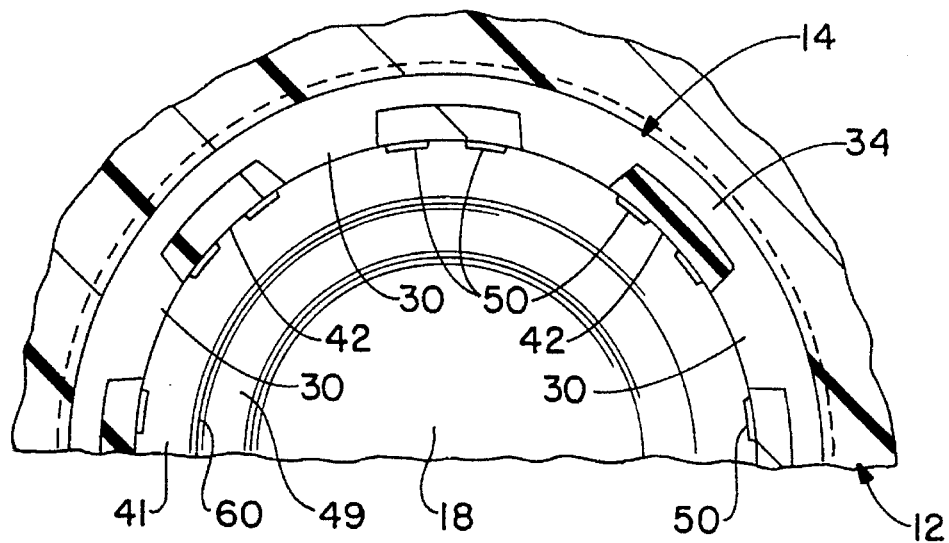
FIG. 6 is a view similar to FIG. 5 but taken on line 6—6 of FIG. 4.
Figure 7:
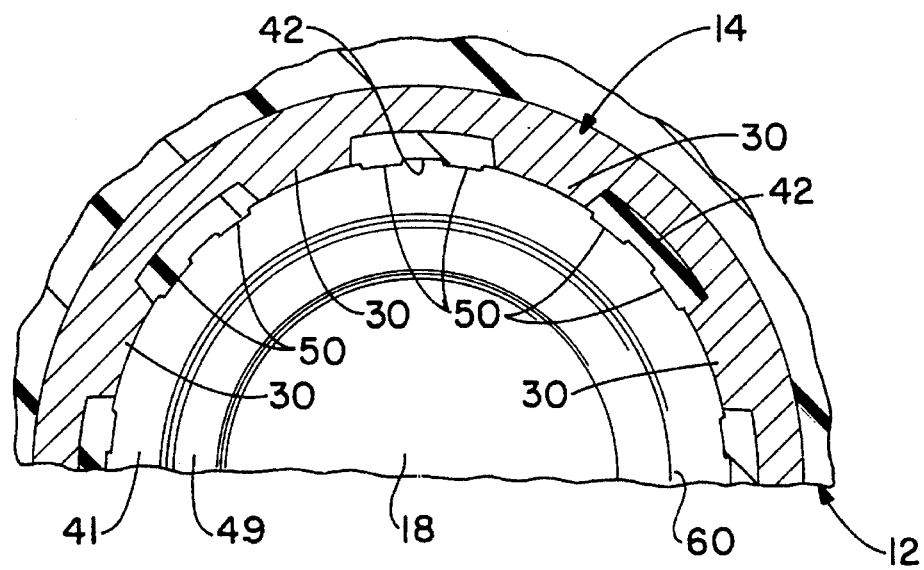
FIG. 7 is another similar cross sectional view but taken on line 7—7 of FIG. 4.

Each of the cylindrical sectional surfaces 42 includes a pair of integral plastic spaced pads or ribs 50, 50 extending therealong in a parallel and axial direction. These ribs or pads are spacedly set back from the bevel 48 so that the bearing 16 has a lead-in to a bore 51 formed by the cylindrical surface 46. Each of these ribs 50, 50 provides an interference fit (slight) with an outer circumference 52 of outer race 54 bearing 16 by deforming and, perhaps, scarfing (abrading) slightly to maintain the outer race 54 of bearing 16 fixed relative to motor housing 13 and motor end cap 12 (FIG. 3). These pads, dependent on mold location will always appear as pairs on the surfaces 42 but the pads may appear, e.g., as ⅓, a full pad and ⅔ of a pad (not shown) on one surface 42 rather than a nicely paired set on each of these surfaces.

Each of the pads or ribs 50, 50, extends the remainder of the width of the dimension stabilizing ring 14 in an outward direction relative to motor end cap 12, while the plastic cylindrical surface 46 its full width so that bevels 38 are filled with molded in plastic to also help maintain the dimension ring 14 in fixed position in end cap 12. The effect of the combined dimension ring 14 and molded plastic, then, is to form a smooth cylindrical inner surface for insertion of the bearing 16 except for the radially inwardly extending pads or ribs 50, 50, 50. The tabs 40, 40, 40, because they are angled and slightly radiused also aid in inserting the bearing 16.

This surface terminates outwardly against a curvilinear lip 60 formed in the inner edge of flat circular land 41 of motor end cap 12 so that the well 20 opens smoothly outwardly in end cap 12. The end cap 12 also has a lead in angled bore 62 formed at its inner termination to provide a smooth transition to the remainder of bore 39.

The bearing 16 is completed by an inner race 56, with the outer race including an annular plastic fixed hollow cylindrical piece 58 fixed to outer race 54 and providing easy rotation for inner race 56 relative to it.

The bearing arrangement 10 is easily formed during actual manufacture. The dimension fixing ring 14 is mounted on a core (not shown) within a die in an injection molding machine and plastic injected around it and within its grooves 32, 32 to form motor housing 13 including motor housing end cap 12.

It should be clear from the foregoing that all the advantages set out for the invention have been met by its described structure. It should also be clear that many modifications could be made to the described structure which would still fall within its spirit and purview.

What is claimed is:

1. A molded motor housing portion having:
    a) a dimension stabilizing ring;
    b) said dimension stabilizing ring molded with said motor housing portion to be disposed therein;
    c) said dimension stabilizing ring having a bore;
    d) a bearing mounted in said bore;
    e) said dimension stabilizing ring maintaining said bearing operatively aligned in said molded housing portion; and
    f) said dimension stabilizing ring being castellated to provide a continuous stepped inner diameter.

2. The molded housing portion having a dimension stabilizing ring as set out in claim 1 wherein:
    a) said castellations include grooves and peaks and the material of said molded housing portion extends into said grooves.

3. The molded housing portion having a dimension stabilizing ring as set out in claim 2 wherein:
    a) said material provides molded axially parallel extending ribs disposed in said grooves.

4. The molded housing portion having a dimension stabilizing ring as set out in claim 3 wherein:
    a) said material fills said grooves to provide a generally cylindrical bore surface with said peaks; and
    b) said ribs extend radially inwardly from said surface to at least deformingly receive said bearing.

5. The molded housing portion having a dimension stabilizing ring as set out in claim 4 wherein:
    a) said bearing includes inner and outer races; and
    b) said outer race is received in a press fit manner by said ribs.

6. The molded housing portion having a dimension stabilizing ring as set out in claim 1 wherein:
    a) said molded housing portion includes a bore for mounting said dimension stabilizing ring; and
    b) molded tabs integral with said housing portion fix said dimension stabilizing ring in said housing portion bore.

7. The molded housing portion having a dimension stabilizing ring as set out in claim 6 wherein:
    a) said tabs abuttingly engage against an end of said dimension stabilizing ring.

8. The molded housing portion having a dimension stabilizing ring as set out in claim 1 wherein:
    a) integral molded ribs of said molded housing portion extend axially parallel along said internal bore of said dimension stabilizing ring to receive said bearing.

9. The molded housing portion having a dimension stabilizing ring as set out in claim 1 wherein:
    a) said dimension stabilizing ring is situated in a bore in said molded housing portion; and
    b) said dimension stabilizing ring is limited in outward movement relative to said molded housing portion by an annular land formed at an outer end of said bore in said molded housing portion.

10. The molded housing portion having the dimension stabilizing ring of claim 7 wherein:
    a) said tabs are triangularly shaped in an axial direction of said dimension stabilizing ring.

11. A molded housing portion having:
a) a bore formed therein;
b) a dimensioning ring having a castellated shape mounted in said bore;
c) a bearing disposed in said bore within said castellated shape;
d) said dimensioning ring having a continuous stepped inner diameter to form said castellated shape; and
e) being made of a relatively non resilient material so as to act as a means for maintaining bore integrity in said molded housing portion.

* * * * *